UNITED STATES PATENT OFFICE.

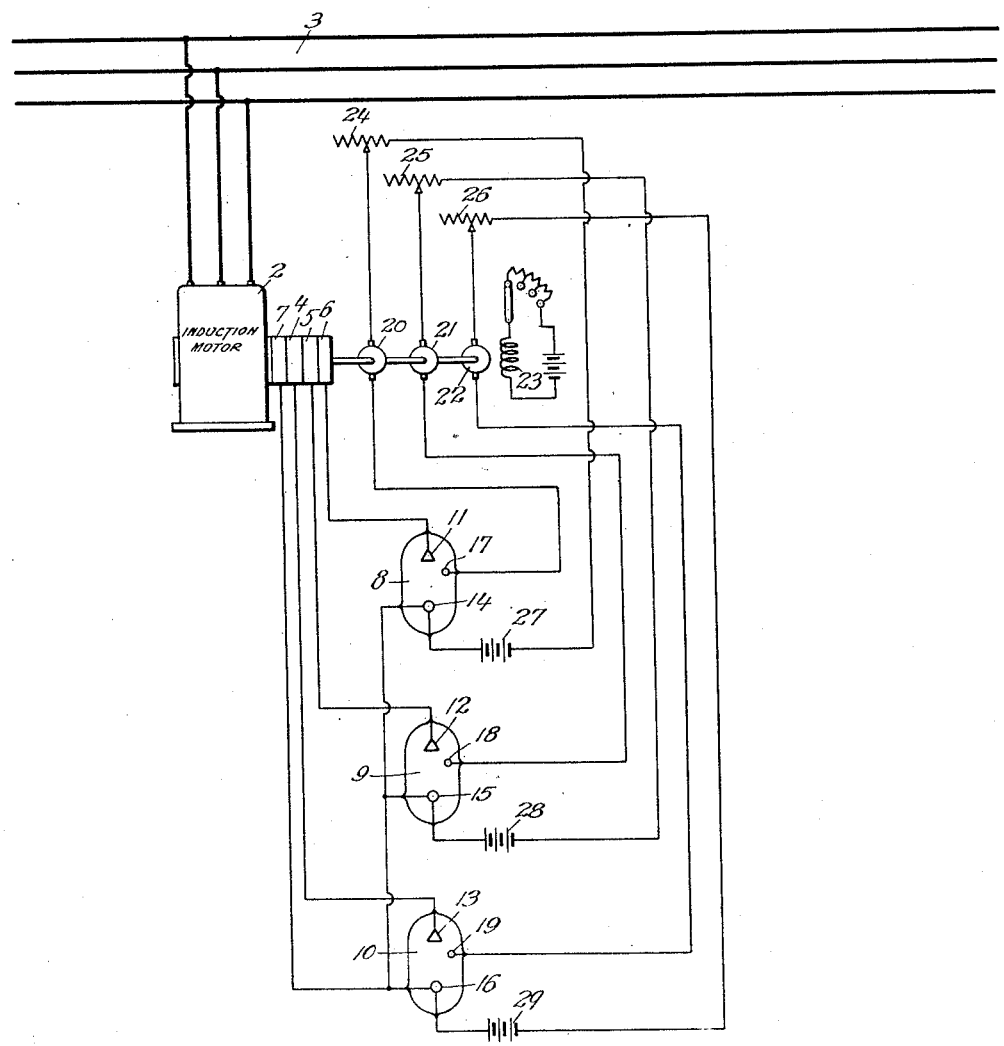

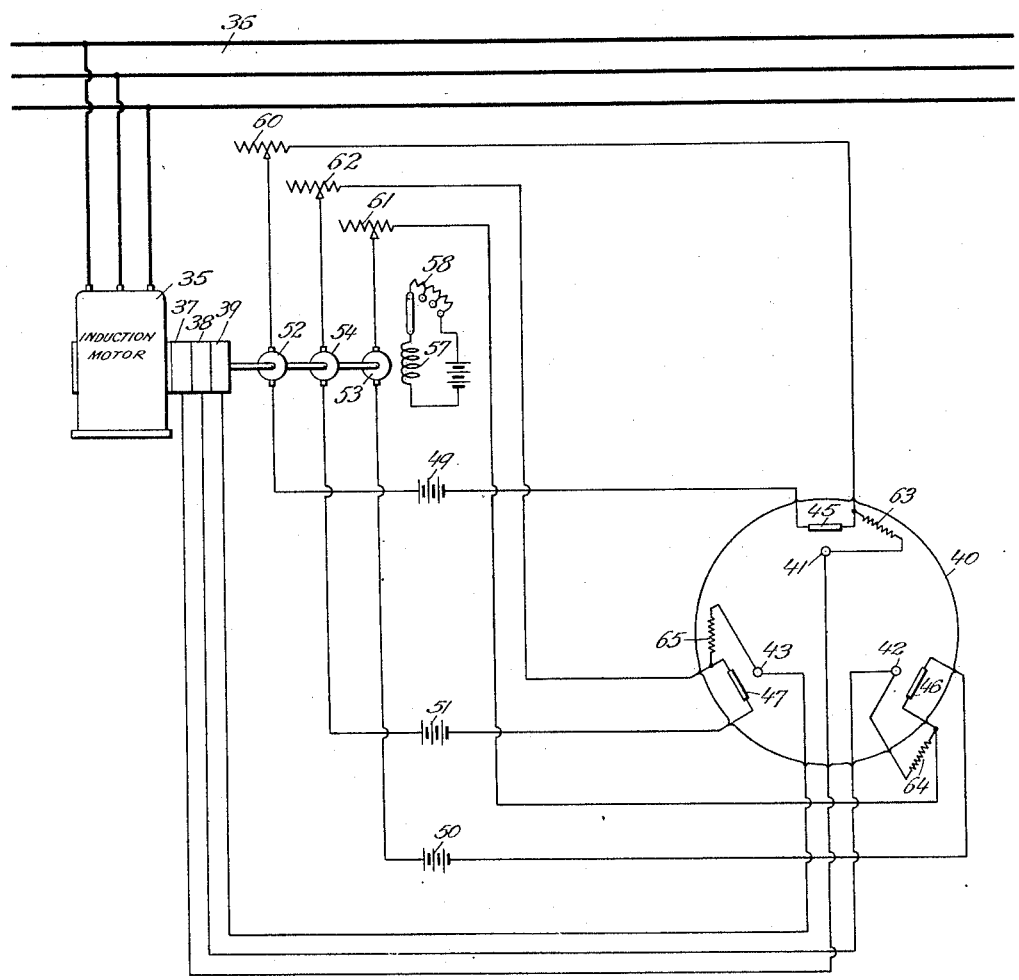

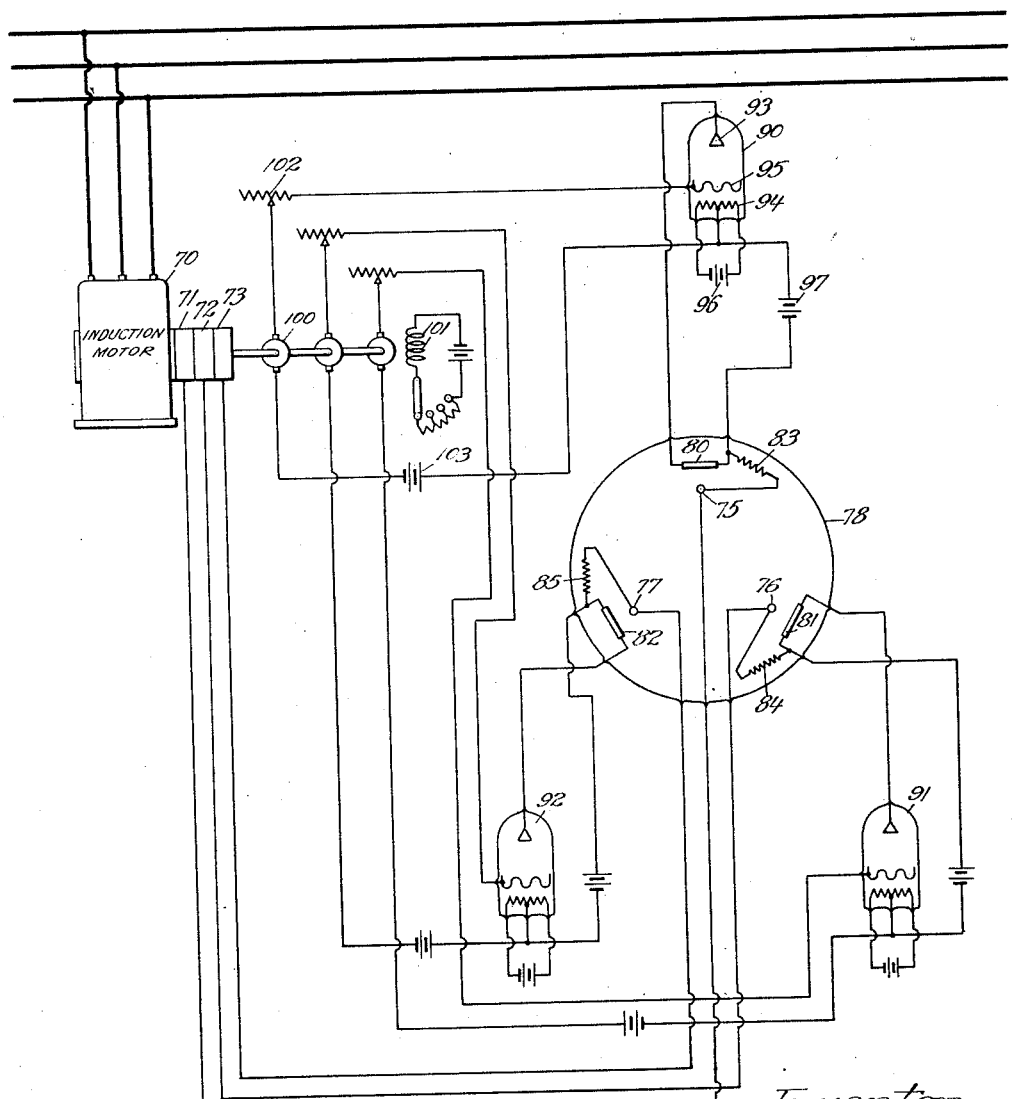

FRIEDRICH WILHELM MEYER, OF MILWAUKEE, WISCONSIN, ASSIGNOR TO THE CUTLER-HAMMER M'F'G CO., OF MILWAUKEE, WISCONSIN, A CORPORATION OF WISCONSIN.

CONTROLLING AND REGULATING APPARATUS FOR ALTERNATING-CURRENT DYNAMO-ELECTRIC MACHINES.

1,411,862.   Specification of Letters Patent.   Patented Apr. 4, 1922.

Application filed January 21, 1918. Serial No. 212,947.

*To all whom it may concern:*

Be it known that I, FRIEDRICH WILHELM MEYER, a citizen of the German Empire, residing at Milwaukee, in the county of Milwaukee and State of Wisconsin, have invented new and useful Improvements in Controlling and Regulating Apparatus for Alternating-Current Dynamo-Electric Machines, of which the following is a specification.

This invention relates to controlling and regulating apparatus for alternating current dynamo electric machines, particularly induction motors.

Induction motors may be controlled and regulated by regulating and controlling the voltages induced in the secondary by the main or load current flowing in the primary. Resistances associated with the secondary are usually employed for this purpose. Resistances, however, are inefficient and, for regulating purposes, require switches and electromagnets for automatically raising and lowering the resistance under varying conditions of load, etc. The switches and electromagnets possess mechanical and electrical inertia and self induction which, as is well understood, are factors productive of tardy, oscillatory and unstable regulation.

One of the objects of this invention is to provide more sensitive and stable regulation.

Another object is to provide improved and efficient apparatus for secondary regulation and control.

Another object is to provide apparatus whereby the secondary voltages are reliably, efficiently and readily controlled without the use of resistances, switches or electromagnets.

Other objects and advantages will appear from the following specification and claims.

In the accompanying drawings certain embodiments of the invention are diagrammatically illustrated and will be herein explained as applied to the secondary control and regulation of three phase induction motors, but the invention is readily susceptible of other embodiments and of being adapted to control and regulate other types of alternating current dynamo electric machines.

In accordance with the embodiments as employed to regulate an induction motor the secondary voltage is regulated by a supplementary voltage produced through an electroionic valve which is adapted to instantaneously respond to and magnify the effects of variations in the operating conditions of the motor brought about by changes in load, voltage drops, etc. The speed and torque of the motor may be controlled at will by changing the operation of the electroionic valve and the regulation is automatic and produced by magnified or augmented and instantaneously applied corrective effects which produce exceedingly stable and regular operation.

In the drawings

Figure 1 shows apparatus for regulating and controlling a three phase induction motor by electroionic valves, which, responding to speed changes in the motor, vary the voltage of the motor secondary.

Fig. 2 shows a modification using a different type of electroionic valve, and

Fig. 3 shows another modification wherein the electroionic valve is controlled by auxiliary electroionic relays to give increased corrective effects.

Fig. 1 will first be described.

An induction motor 2 is shown with its primary or stator windings connected directly to a source of three phase alternating current 3. The secondary or rotary windings may be connected in the well known Y or star arrangement with the outer terminals connected to slip rings and brushes 4, 5 and 6 in the usual manner. The common point of the windings is connected to a slip ring and brush 7. The motor is regulated and controlled by varying the effective voltage of the rotor, or secondary, which voltage is that induced in the rotor windings by the line or load current taken by the primary modified by the effect of a plurality of electroionic valves 8, 9 and 10. In the arrangement shown, for the sake of simplicity, only sufficient electroionic valves for affecting half waves of the rotor pulsations are provided, it being well understood that, if both half waves of the pulsations are to be affected, the apparatus may be duplicated.

The electroionic valves 8, 9 and 10 shown are of the arc discharge type and are provided with anodes 11, 12 and 13, cathodes 14, 15 and 16 and auxiliary or ignition anodes 17, 18 and 19. By changing the conditions of the discharges in valves 8, 9 and 10 controlling and regulating effects similar to those produced by variable resistances in the motor secondary can be secured without the disadvantages and losses hereinbefore pointed out as inherent in the resistance method of control.

The discharges are influenced by motor speed variations brought about through changes in load, etc., through small direct current generators or tachometer machines 20, 21 and 22. The tachometer machines are driven by, and therefore simulate the operative conditions of the motor and are provided with a variable separately excited field 23. The tachometer terminals are respectively connected in circuit with auxiliary anodes 17, 18 and 19 and cathodes 14, 15 and 16 through adjustable resistances 24, 25 and 26 and batteries 27, 28 and 29. The batteries and corresponding tachometers are connected so that their voltages are opposed, the voltages of the batteries normally predominating. The cathodes 14, 15 and 16 are also connected to the slip ring and brush 7.

Through changes in the tachometer voltages the voltages between the auxiliary anodes 17, 18 and 19 and the corresponding cathodes 14, 15 and 16 are varied which influences the main discharges and consequently the voltage of the motor secondary. By varying the time of the discharges a variable transformer effect may also be produced between the motor primary and secondary circuits. A slight increase in the speed of the motor brought about by a change in load, etc., increases the speed of the tachometers 20, 21 and 22. The tachometers produce higher voltages and the difference between the battery and tachometer voltages is decreased. This decreases the voltages impressed between the supplementary anodes 17, 18 and 19 and cathodes 14, 15 and 16. The voltages consumed in the valves 8, 9 and 10 are therefore increased and the time of ignition may also be delayed. Both of these effects act to decrease the voltages of the secondary and the motor speed falls. A decrease in motor speed results in the opposite effect. The initial conditions may be readily varied by changing the field excitation of the tachometers or the manipulation of resistances 24, 25 and 26.

Fig. 1 shows exceedingly simple apparatus for regulating and controlling the secondary voltages and many modifications may be made without departing from the spirit of the invention. For example the electrodes of the electroionic valve may be combined in a single vessel and the electrodes may be of special types and have various characteristics, certain examples being shown in the other figures.

Fig. 2 shows an induction motor 35 with its primary or stator connected directly to a source of three phase alternating current 36. The secondary or rotor windings of the motor are brought out to slip rings and brushes 37, 38 and 39 in the usual manner. The motor is regulated and controlled by varying the effective voltage of the rotor, which voltage is varied by a special type of duplex electroionic valve 40.

Electroionic valve 40 comprises three electrodes 41, 42 and 43 which are connected respectively to the motor brushes and slip rings 37, 38 and 39. As will be hereinafter explained each of the electrodes 41, 42 and 43 may act and in operation do function alternately as an anode and as a cathode. The electroionic valve 40 is also provided with supplementary cathodes 45, 46 and 47 located in close proximity to the electrodes 41, 42 and 43 respectively.

The supplementary cathodes 45, 46 and 47 are heated by current supplied from batteries 49, 50 and 51 respectively. The amount of current supplied to and consequently the degree of heat of the cathodes 45, 46 and 47 is controlled by small direct current generators or tachometer machines 52, 53 and 54 respectively. The batteries 49, 50 and 51 and the corresponding tachometers 52, 53 and 54 are so connected in circuit that their voltages are opposed, the voltages of the batteries normally predominating.

The tachometers are connected directly to the motor shaft and thus simulate the operating conditions of the motor. Therefore when the speed of the motor decreases the tachometers produce a small voltage, the difference in voltage between the batteries and tachometers consequently increases and more current is supplied to heat the supplementary cathodes 45, 46 and 47.

The tachometers have a common separately excited field 57 which can be controlled at will through a rheostat 58. The current to the cathodes can also be controlled by adjustable resistances 60, 61 and 62 respectively located in the various circuits of the tachometers and cathodes 45, 46 and 47. Between one terminal of the supplementary cathodes and the corresponding electrodes 41, 42 and 43 small resistances 63, 64 and 65 are connected. These resistances may be located within the valve as illustrated for resistances 63 and 65 or outside of the valve as shown for resistance 64.

The operation is as follows: The load current in the motor primary induces voltages in the motor secondary windings which successively pass through cycles corresponding to the line cycles. It will therefore be apparent that the potential between the electrodes 41, 42 and 43 passes through corresponding cycles creating a rotary discharge in valve 40. For example the arc may first pass between electrodes 41 and 42, electrode 41 acting as an anode and electrode 42 as a cathode. This arc after starting builds up to a maximum and then falls off as the induced voltage in the corresponding winding of the motor secondary decreases. As the arc between electrodes 41 and 42 falls off the potential between electrodes 42 and 43 is building up, and, after the extinguishment of the arc between electrodes 41 and 42 an arc is started between electrodes 42 and 43 when the critical or ignition voltage is reached. Electrode 42 is now an anode and electrode 43 a cathode. Next the arc passes between electrodes 43 and 41, electrode 43 being the anode and electrode 41 being the cathode. This cycle of operations continues during the operation of the motor, the frequency of the changes corresponding to the frequency of the motor secondary which depends upon the slip of the motor.

In order to facilitate the formation of the arcs, to sharply define the arcs and to provide regulation and control the supplementary cathodes are employed. The arc from anode 41 first forms between anode 41 and auxiliary cathode 46, the discharge between these electrodes taking place at a voltage lower than that required to force an arc between electrodes 41 and 42. The arc once started between anode 41 and cathode 46 readily shifts to electrode 42. The arc between anode 41 and cathode 46 is almost immediately extinguished because when once started through electrode 42 the resistance of the path directly between electrodes 41 and 42 is less than that between 41 and 42 through cathode 46 on account of the resistance 64. Similarly the arc from electrode 42 first starts between that electrode and auxiliary cathode 47, later shifting to electrode 43.

By regulating and controlling the heating of the auxiliary cathodes 45, 46 and 47 the formation of the arcs between the electrodes 41, 42 and 43 and the auxiliary cathodes can be varied and consequently the formation of the arcs between the main electrodes can be regulated and controlled. If the motor speed, for any reason, decreases, the voltages of the tachometer machines simultaneously decrease. The difference of potential between the tachometers and batteries 49, 50 and 51 immediately increases and more current is supplied to the auxiliary cathodes. The heat of these cathodes is accordingly increased, the arcs from electrodes 41, 42 and 43 to the auxiliary cathodes and consequently also between these main electrodes takes place sooner and also the cathode voltage or corresponding ionization voltage increases. Thus the voltage consumed in the valve 40 is diminished and the voltage of the motor secondary circuit increased. This increase in voltage raises the motor speed.

An increase in motor speed brought about by variations in voltage drops, load, etc. has the opposite effect. The tachometers then generate higher voltages, the difference in voltages between the tachometers and the batteries are decreased and less current is supplied to the auxiliary cathodes. The temperature of the auxiliary cathodes decreases and consequently the formation of the arcs in valve 40 is less easily accomplished and maintained. Therefore the effective voltage of the motor secondary is decreased and the motor speed decreases.

The corrective effects thus applied are greatly augmented or increased by the characteristic action of the electroionic valve and may take place practically simultaneously with any deviation in motor operation. Stable and close regulation may thus be obtained. The speed and torque of the motor may be readily varied by the manipulation of the tachometer field or variable resistances 60, 61 and 62.

Fig. 3 shows a similar arrangement, the corrective effects being increased or augmented by the use of auxiliary electronic valves or relays or other electroionic valves or relays. A motor 70 has its primary windings directly connected to the line and has slip rings and brushes 71, 72 and 73. The slip rings and brushes are connected respectively to three main electrodes 75, 76 and 77 of an electroionic valve 78 as before. Each main electrode has associated therewith a supplementary cathode 80, 81 and 82 respectively. Between the electrodes 75, 76 and 77 and the corresponding auxiliary cathodes 80, 81 and 82 are connected small resistances 83, 84 and 85 respectively.

Each auxiliary cathode is respectively heated by current supplied through an electronic valve or relay 90, 91 or 92. Since all of the relays are alike and function in the same way only one need be described. Relay 90 has an anode 93, a cathode 94 and an auxiliary anode 95 which may take the form of a grid. Cathode 94 is heated by current from a battery 96. A battery 97 is connected in circuit between one terminal of auxiliary cathode 80 of valve 78 and the middle of cathode 94. The other terminal of auxiliary cathode 80 is connected to anode 93. Battery 97 supplies the current for heating auxiliary cathode 80, and the amount of current thus supplied is determined by the voltage consumed in relay 90.

Driven by the motor to simulate the operation thereof is a direct current tachometer machine 100. Tachometer machine 100 has an adjustably separately excited field 101. One brush of the tachometer machine 100 is connected to the auxiliary anode 95 of relay 90 through an adjustable resistance 102, the other brush of the tachometer being connected in series with a battery 103 to the middle of cathode 94 of relay 90. The voltages of battery 103 and tachometer 100 oppose each other and normally the voltage of the battery predominates.

As previously explained in connection with Fig. 2 the arcs in valve 78 start between the main electrodes and the auxiliary cathodes and then pass between the main electrodes in rotation. The heat of the auxiliary cathodes determines the point of the starting and also the character of the arcs and consequently the resistance of the motor secondary circuit.

If the speed of the motor decreases for any reason the tachometer machine 100 simultaneously produces less voltage. The difference in voltage between battery 103 and tachometer machine 100 consequently increases and the voltage between auxiliary anode 95 and cathode 94 of relay 90 increases. The voltage consumed in relay 90 thereupon decreases resulting in battery 97 supplying more current to auxiliary cathode 80 of valve 78. The arc between electrode 77 and auxiliary cathode 80 and consequently between electrodes 77 and 75 accordingly forms more readily and is maintained more easily, the resistance of the motor secondary circuit is decreased and the motor increases in speed.

Slight variations in motor speed cause relay 90 to produce greatly magnified effects upon auxiliary cathode 80 which therefore magnifies the effects upon the arc in the valve 78. Each relay has a tachometer machine so that the effects on all of the auxiliary cathodes 80, 81 and 82 are simultaneously applied so that corrective effects are immediately produced regardless of the electrodes between which the arc is passing at the time corrective forces are required.

The speed and torque of the motor may be controlled at will by means of the rheostat in the motor field or the resistances in the circuit between the tachometer and the auxiliary anodes of relays 90, 91 and 92.

It has been found by experiment that the resistances between the main electrodes and the heated or auxiliary cathodes may be omitted with satisfactory results.

What I claim is:

1. Regulating apparatus for an alternating current motor provided with primary and secondary windings, comprising an electroionic valve having a plurality of main electrodes connected to the secondary windings and having a plurality of auxiliary electrodes associated respectively with the main electrodes, the discharge between associated auxiliary and main electrodes controlling the discharge between main electrodes and the main discharge controlling the voltage of the motor secondary, a dynamo electric machine simulating the operation of the motor and creating an electromotive force varying with the speed variations of the motor and connected in circuit with an auxiliary electrode so as to impress thereon the varying voltage to control the auxiliary discharge coincidently and in accordance with the motor speed variations.

2. Regulating apparatus for an alternating current motor having a primary and a secondary, comprising an electroionic valve provided with electrodes and having a discharge path included in circuit with the secondary, the voltage impressed upon one of the electrodes controlling the discharge across said path and the discharge controlling the voltage of the motor secondary, and means influenced by the motor speed variations and controlling the impressed voltage in accordance with the motor speed variations and coincidently therewith.

3. In combination with an alternating current motor having a secondary winding, an electroionic valve provided with electrodes and having a discharge path included in circuit with the secondary winding, and means influenced by the motor speed variations and connected to one of the electrodes so that a voltage varied by said means coincidently and in accordance with the motor speed variations is coincidently impressed upon the connected electrode, the impressed voltage controlling the discharge across said path and the discharge controlling the motor secondary voltage coincidently and in accordance with the motor speed variations.

4. The combination with a motor having a primary and a secondary, of an electroionic valve having main electrodes and an auxiliary electrode providing main and auxiliary discharges, the auxiliary discharge controlling the main discharge which in turn controls the voltage of the motor secondary, and means for controlling the voltage impressed upon the auxiliary electrode thereby to control the auxiliary discharge in accordance with the motor speed variations and coincidently therewith.

5. The combination of an alternating current machine having primary and secondary windings, a plurality of sets of electroionic discharge electrodes associated with the secondary to control the voltage thereof, and means influenced by the speed variations of the machine and connected to one electrode of each set so that a voltage varied by said means coincidently and in accordance with the machine speed variations is coincidently impressed upon the connected electrodes whereby corrective influences are impressed upon the secondary in substantial synchronism with the machine speed variations.

6. Regulating apparatus for an alternating current motor provided with a primary and a secondary, comprising an electroionic valve having electrodes connected to the terminals of the secondary thus providing for a discharge in the circuit thereof, a dynamo electric machine simulating the operation of the motor and creating an electromotive force varying with the motor speed variations, and connections between the dynamo electric machine and the electroionic valve and including an electrode thereof whereby the varying electromotive force may be impressed upon the connected electrode of the valve to vary the discharge coincidently and in accordance with the motor speed variations.

7. In combination with a motor having primary and secondary windings of an electroionic valve having a main and an auxiliary discharge, the auxiliary discharge controlling the main discharge and the main discharge controlling the voltage of the motor secondary, and means for controlling the auxiliary discharge in accordance with speed variations of the motor and coincidently therewith.

8. A regulating apparatus for an alternating current dynamo electric machine with a secondary winding comprising an electroionic valve having a set of main electrodes and associated auxiliary electrodes, means for controlling the discharges to the auxiliary electrodes whereby the discharges of the main electrodes are varied, said means responding simultaneously to and in accordance with variations in the operating conditions of the motor and affecting the discharge to the auxiliary electrodes coincidently with the varations.

9. A regulating apparatus for an alternating current dynamo electric machine with a secondary winding, comprising an electroionic valve having a set of main electrodes and associated auxiliary electrodes, and means for controlling the discharges to the auxiliary electrodes whereby the discharges of the main electrodes are varied, said means responding coincidently and in accordance with variations in the operating conditions of the motor and affecting the discharges to the auxiliary electrodes coincidently with the variations, and an electroionic relay for communicating and augmenting the effect of said means upon the auxiliary discharges.

10. In combination an electroionic discharge valve, auxiliary electrodes for said valve to control the discharges therein, a motor having a secondary associated with said device whereby the secondary voltage is regulated, and means influenced by speed variations of the motor for affecting the operation of said auxiliary electrodes to vary the secondary voltage of the motor coincidently and in accordance with and to compensate for speed variations of the motor.

In witness whereof, I have hereunto subscribed my name.

FRIEDRICH WILHELM MEYER.